United States Patent
Usui et al.

(10) Patent No.: US 7,379,674 B2
(45) Date of Patent: May 27, 2008

(54) OPTICAL TRANSMISSION DEVICE

(75) Inventors: Fumiaki Usui, Tochigi (JP); Ryuji Ohmuro, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 679 days.

(21) Appl. No.: 10/809,300

(22) Filed: Mar. 24, 2004

(65) Prior Publication Data

US 2004/0202482 A1    Oct. 14, 2004

(30) Foreign Application Priority Data

| Mar. 27, 2003 | (JP) | ............................. 2003-088041 |
| Mar. 27, 2003 | (JP) | ............................. 2003-088042 |
| Feb. 3, 2004 | (JP) | ............................. 2004-026754 |
| Feb. 3, 2004 | (JP) | ............................. 2004-026755 |

(51) Int. Cl.
*H04B 10/00* (2006.01)
(52) U.S. Cl. ........................................ 398/131; 359/833
(58) Field of Classification Search ............... 250/201, 250/204; 398/16, 128–131, 153, 135; 362/305, 362/308; 356/28.5; 355/52–53; 359/833
See application file for complete search history.

(56) References Cited

U.S. PATENT DOCUMENTS

| 4,742,218 | A | * | 5/1988 | Nakamura et al. ........ 250/201.5 |
| 4,867,560 | A | | 9/1989 | Kunitsugu |
| 5,349,176 | A | | 9/1994 | Czichy |
| 5,627,669 | A | | 5/1997 | Orino |
| 5,644,375 | A | * | 7/1997 | Suzuki ........................ 351/208 |
| 6,175,451 | B1 | | 1/2001 | Iriyama |
| 6,178,024 | B1 | | 1/2001 | Degura |
| 6,219,133 | B1 | | 4/2001 | Kawase |
| 6,522,397 | B2 | * | 2/2003 | Barricau et al. ............ 356/28.5 |
| 6,717,651 | B2 | * | 4/2004 | Kato et al. ..................... 355/55 |
| 2004/0190908 | A1 | | 9/2004 | Yoshimi |
| 2004/0202482 | A1 | | 10/2004 | Usui |

FOREIGN PATENT DOCUMENTS

| DE | 4033776 A1 | 5/1992 |
| DE | 3855021 T2 | 7/1996 |
| EP | 0658987 A1 | 6/1995 |
| EP | 0876012 A2 | 11/1998 |
| EP | 0911995 A2 | 4/1999 |
| JP | 5-122155 A | 5/1993 |
| JP | 5-133716 A | 5/1993 |
| JP | 7-71956 A | 3/1995 |
| JP | 8-265263 A | 10/1996 |
| JP | 9-181340 A | 7/1997 |

(Continued)

*Primary Examiner*—Richard Hjerpe
*Assistant Examiner*—Shaheda A Abdin
(74) *Attorney, Agent, or Firm*—Canon U.S.A. Inc. I.P. Division

(57) ABSTRACT

An optical transmission device for providing stable communication with a partner device by reducing errors in optical axis misalignment. The errors are caused by uneven distribution of the light intensity in a received light beam resulting from atmospheric microscopic fluctuations. One embodiment includes a transmission and receiving unit, which employs two photodetectors, one aligned with and the other misaligned with the optical axis of the optical transmission device. Other embodiments employ a movable means for shifting a photodetector or a lens unit relative to the optical axis of the optical transmission device.

10 Claims, 8 Drawing Sheets

FOREIGN PATENT DOCUMENTS

| | | |
|---|---|---|
| JP | 11-98081 A | 4/1999 |
| JP | 2001-094513 A | 4/2001 |
| JP | 2001-111491 A | 4/2001 |
| JP | 2004-312697 A | 11/2004 |
| JP | 2004-312698 A | 11/2004 |

* cited by examiner 8a (8 in the case of alternative embodiment)

$L \leqq D$ 8b
(8 in the case of alternative embodiment)

OPTICAL TRANSMISSION DEVICE

BACKGROUND OF THE INVENTION

1. Field of the Invention

The present invention generally relates to communication devices and more specifically to optical transmission devices for providing two-way communication.

2. Description of the Related Art

Japanese Unexamined Patent Laid-Open No. 5-133716 discloses a conventional optical transmission device configured to perform two-way communication by using two communication devices that spatially separated from each other. FIG. 5 shows such an optical communication device A that communicates light beams LA as well as receives light beams LB from another communication device B (not shown).

In operation, a laser beam is emitted from a laser diode 101 and propagated as linearly polarized light through a lens group 102. Thereafter, it is reflected from a polarizing beam splitter 103, and then reflected by a variable-angle mirror 104a of an optical axis adjusting unit 104 to the device B.

Similarly, the received light beam LB from device B is reflected by the variable-angle mirror 104a, through the beam splitter 103 to branching element 105. A substantial portion of the light beam LB is transmitted through the branching element 105 to a photodetector 106 by a lens group 107. The other portion of light beam LB is reflected from the branching element 105 to a photodetector 108, which is a position photodetector, via a lens group 109. A substantial portion (LBa) of the received light beam LB is transmitted through the beam branching element 105, and is converged onto a photodetector 106 by a lens group 107. The photodetector 106 acts as a real signal photodetector. The other portion of light beam LBb reflected from the beam branching element 105 is converged by a lens group 109 as a luminous flux which is received by a photodetector 108.

In order to achieve the most efficient transmission and reception of light, an optical axis 112 on the beam splitter side, which corresponds to the common optical axis for transmission and reception, can be backwardly inclined so that the directions of the transmitting light beam LA and the received light beam LB form right angles with respect to each other.

For high-capacity communication, a small element having an effective light receiving area of less than 1 mm, such as an avalanche photodetector, must be used as the photodetector 106. And, the positions of the photodetector 106 and the position detecting photodetector 108 are aligned so that the light beam LB falls on the effective receiving area of the photodetector 106. The variable-angle mirror 104a is adjusted so that the optical axis of the light beam LB is at the center of the photodetector 108.

For efficient communication, the optical axis of the light beam LA is aligned with the center of the photodetector 108. A spot SP generated on the surface of photodetector 108 by light beam LB, provides a misalignment infonnation signal that is received and processed by a signal processing unit 110, which is then transmitted to a mirror drive control unit 111 to generate a correction signal. Based on this signal, the angle of the variable-angle mirror 104a is adjusted to continuously align the optical axes of the light beams LA and LB.

The photodetector 108 generally employs a quadrant photodetector, which is divided into four elements 121 by a separation area 122 as shown in FIG. 6. The method for detecting a position using a photodetector has been described in e.g., Japanese Laid-open patent 2001-94513. Such a photodetector 108 is arranged so that the light receiving surface (plate) of the quadrant photodetector is generally located in a position defocused to a converging point of the lens group 109.

However, the optical transmission device, which transmits and receives light beams through the atmospheric air in the related art described above is affected by a phenomenon in which the transmitted light beam fluctuates due to microscopic fluctuations in the air.

FIG. 7 is an explanatory drawing showing modeled microscopic fluctuations, in which the distribution of strength of the transmitting light fluctuates in the atmosphere. The symbol W designates the width of light beam LA from device B. Since atmospheric air is inhomogeneous, the refractive index varies spatially and temporally. When an air layer partially having a high refractive index exists in an optical pass of the transmission light LA, the portion of the high refractive index works as a convex lens, and thereby generates a light-concentrating effect and point W1, which is high in intensity, and point W2, which is low in intensity, are generated in the width W of the transmitting light beam LA at the position of the receiving device A.

Also, since the distribution of intensity varies temporally, point W2 appears to fluctuate within width W, a phenomena known as microscopic fluctuation. A disadvantage of the related art is that since the light receiving surface of the photodetector 108 is set at a position defocused from the converging point during microscopic fluctuations of the atmospheric air, the distribution of light intensity in spot SP becomes uneven.

In FIG. 7, the distribution of light intensity at the beam entrance M of the device (the entrance pupil), is projected as shown. Consequently, the spot SP having an adequate area on the light receiving surface is as shown in FIG. 8.

As shown in FIG. 9, the spot SP having a diameter T, hatched portions P1 of high-intensity and portions P2 of low intensity are generated, and the center of light intensity PC, which differs from the center of luminous flux BC, is determined to be the optical axis. Therefore, misalignment of the direction of the optical axis of the transmitting light beam LA occurs by an angle corresponding to an amount of misalignment S, and consequently, the transmitting light beam LA is deviated from the device B, which can cause interruptions in the communication system.

To solve the above-mentioned problems, it is preferable that photodetector 108 is arranged in a position adjacent to the converging point of the lens group 109 and the size of the spot SP is arranged so as to be less than the minimum resolution of the device. However, the light beam can intersect separation area 122 between each of the divided elements, and when the spot SP crosses over the light beam intersects separation area 122, the output from the photodetector 108 suddenly becomes low and is stopped in the worse case.

In such a case, although the optical axis actually exists on the photodetector 108 and the communication is normally and rightly being conducted, the system wrongly detects that the optical axis has been misaligned and moves the mirror 104a so as to align the optical axis. Thereby the optical axis existing on the photodetector 108 is shifted out of the correct range and the communication is terminated.

SUMMARY OF THE INVENTION

The present invention resolves one or more of the aforementioned problems and provides a cost-effective optical transmission device that allows stable communication between two optical communication devices. Such stable communication is achieved despite the presence of microscopic fluctuations in the atmospheric air, which cause optical axis misalignment resulting from uneven distribution of light intensity in the received light beam. By employing the present invention, such optical axis misalignment errors are reduced.

According to one embodiment, an optical transmission device including at least two position detecting photodetectors is disclosed. Each photodetector has a plurality of light receiving units divided by separation zones, for detecting the direction of incidence of a luminous flux emitted from the transmitting unit of an opposed partner device, wherein the optical axes of optical system of at least two position detecting photodetectors are shifted from each other. The shifting amount is larger than the width of the separation zones of the position detecting photodetector within a plane perpendicular to the optical axes of the optical system.

The optical transmission device according to the present invention is characterized in that the length of the optical paths in the direction of the optical axes of the optical system of at least two position detecting photodetectors are equivalent.

The luminous fluxes entering at least two position detecting photodetectors are separated by a luminous flux dividing element, the light converging element is provided upstream of the luminous flux dividing element, and the optical axis of the light converging element is aligned with the optical axis of one of the two position detecting photodetectors.

Even when separation zones do exist on the position detecting photodetector, the position detecting light beam is not lost from sight. In addition, stable communication is still achieved even with microscopic fluctuations in the air.

Further features and advantages of the present invention will become apparent from the following description of the preferred embodiments (with reference to the attached drawings).

DETAILED DESCRIPTION OF THE INVENTION

Figure 1:
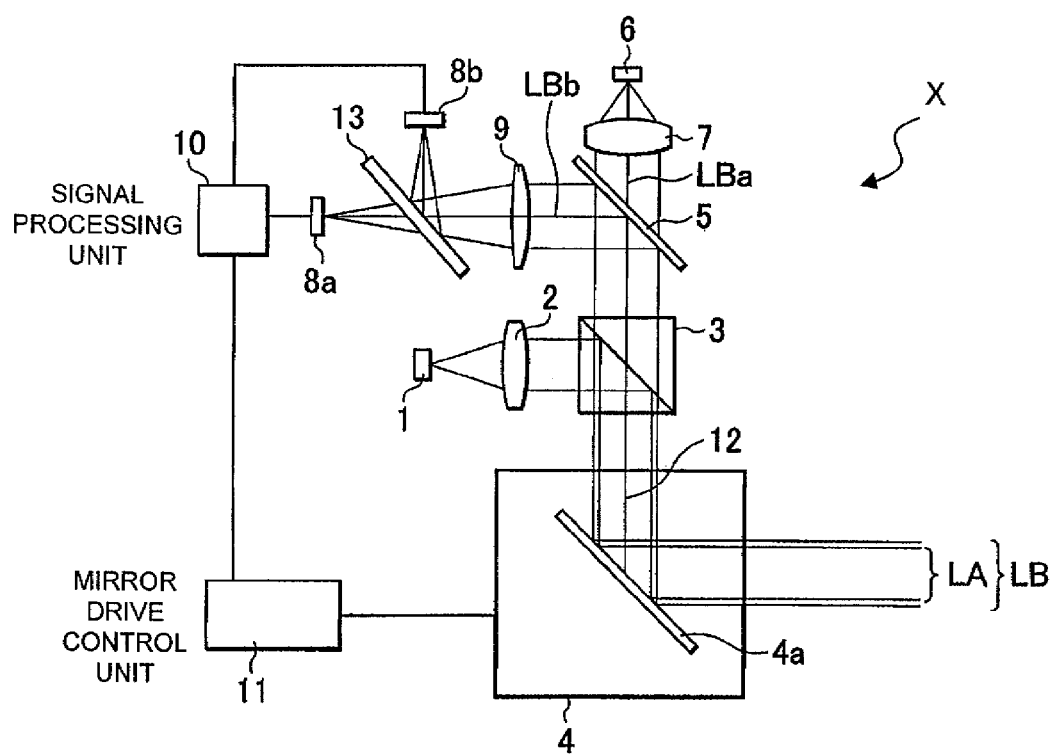
FIG. 1 is a block diagram of an optical transmission device according to an embodiment of the present invention.

FIG. 1 is a schematic drawing showing an optical transmission device (device X) for providing stable communication with a device Y (not shown) according to a first embodiment of the present invention. A laser beam, which is emitted from a laser diode 1, is propagated as linearly polarized light and is transmitted through a lens group 2 (with positive power). The beam is reflected from a boundary surface of a polarizing beam splitter 3, and is reflected by a variable-angle mirror 4a of an optical-axis adjusting unit 4. It is then projected as transmitting light LA from device X to device Y.

A received light beam LB is transmitted from the device Y and is reflected by the variable-angle mirror 4a about an optical axis 12, and transmitted through the beam splitter 3 to a received light branching element 5. A substantial portion (LBa) of the received light beam LB is transmitted through the beam branching element 5, and is converged onto a photodetector 6 by a lens group 7. The photodetector 6 acts as a real signal photodetector. The other portion of light beam LBb reflected from the beam branching element 5 is converged by a lens group 9 as a luminous flux a dividing element 13 represented by a half-mirror or a prism, which divides the luminous flux. One portion of the luminous flux is received by a first photodetector 8a, which is a position detecting photodetector, and the remaining luminous flux is received by a second photodetector 8b, which is also a position detecting photodetector. Note that the length of the optical paths to the first photodetector 8a and the second photodetector 8b are substantially the same. Thereafter, signals generated by the photodetectors 8a and 8b are received and processed by a signal processing unit 10, which are then transmitted to a mirror drive control unit 11 to generate a correction signal.

The optical axis of the first photodetector 8a is orthogonal to the optical axis of the second photodetector 8b.

Figure 2:
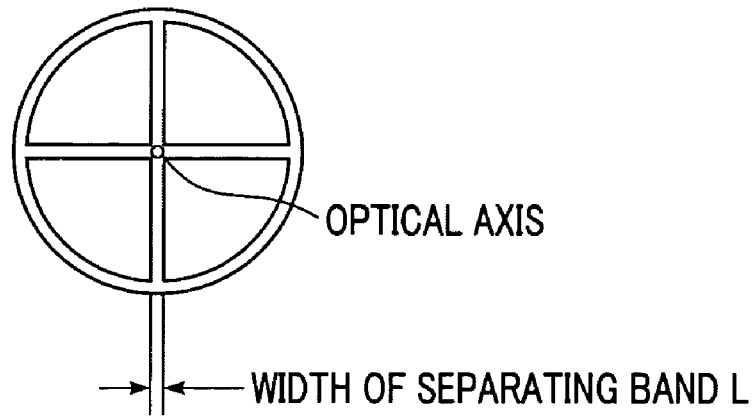
FIG. 2 shows a layout of a photodetector without a shift in optical axis according to an embodiment of the present invention.
Figure 3:
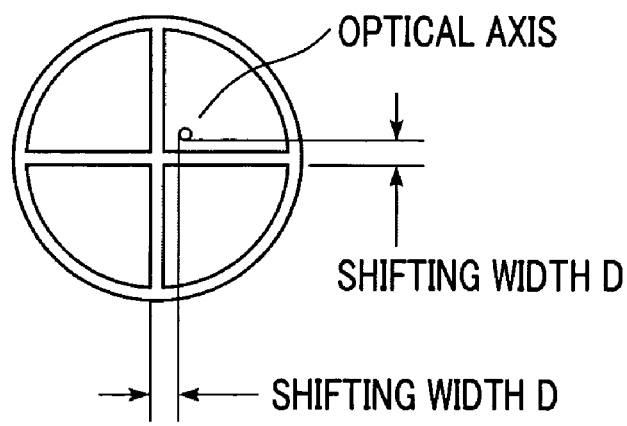
FIG. 3 shows a layout of a photodetector with a shift in optical axis according to an embodiment of the present invention.

As shown in FIG. 2, the first photodetector 8a is disposed so that the intersecting points of the separation zones (blind zones) of the photodetectors align with the optical axis of the photodetector optical system. However, as shown in FIG. 3, the second photodetector 8b is disposed at a position shifted from the optical axis of the first photodetector 8a of the photodetector optical system by an amount D, which is the width amount by which optical axis is shifted. Note that amount D is larger than the width L, which is the separating distance between the plurality of photodetectors in the separation zones photodetector both in the vertical and horizontal directions.

In the present embodiment, the exemplary width of the separation zones of the photodetectors is 0.02 mm.

Figure 4:
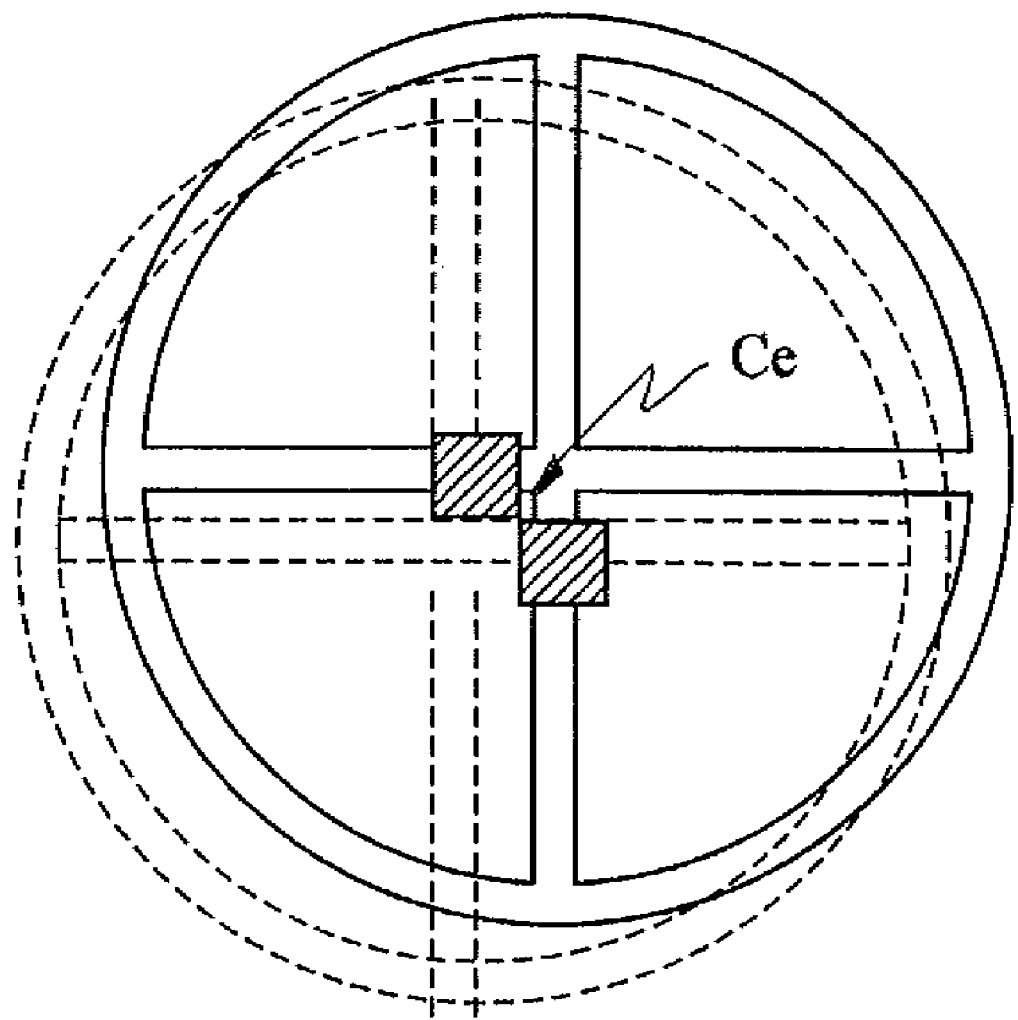
FIG. 4 is an image diagram of the detectable area according to the embodiment.
Figure 5:
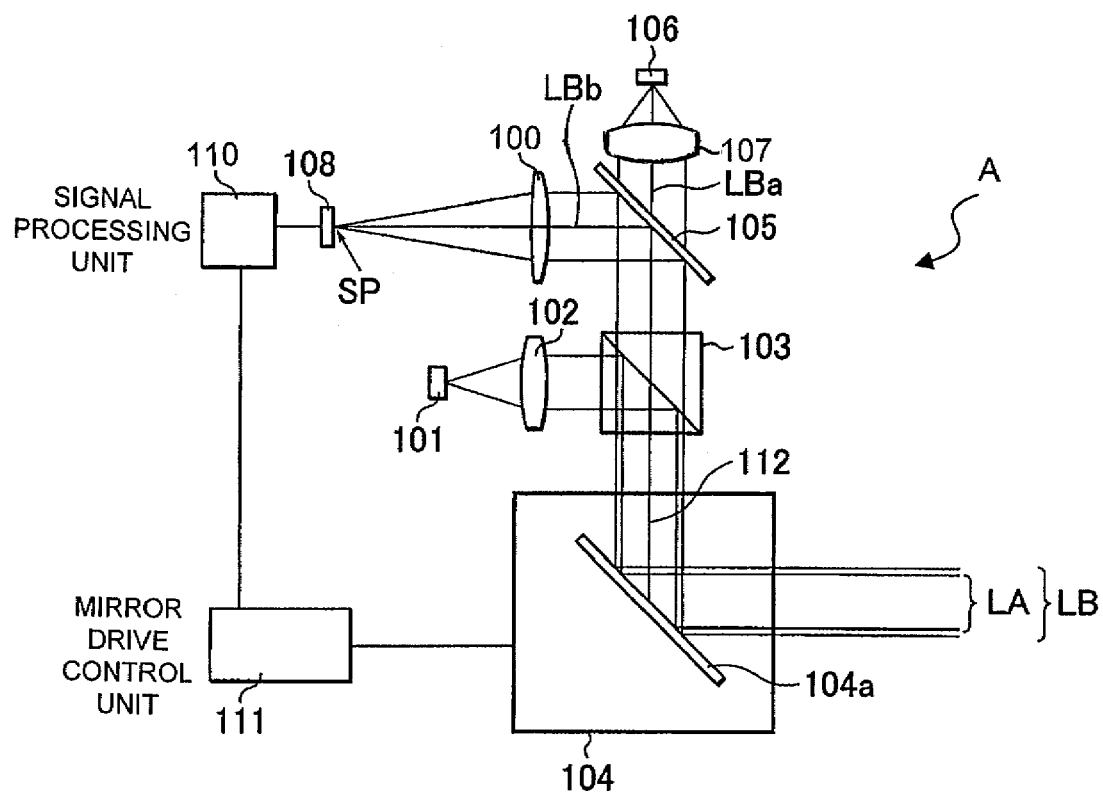
FIG. 5 is a block diagram of an optical transmission device of the related art.
Figure 6:
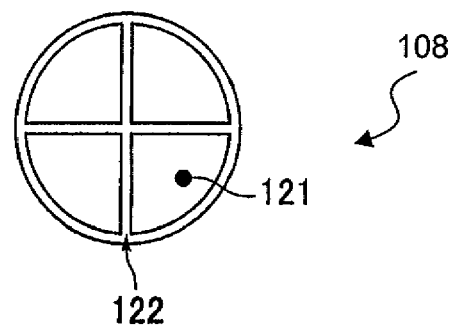
FIG. 6 is a front view of the position detecting photodetector.
Figure 7:
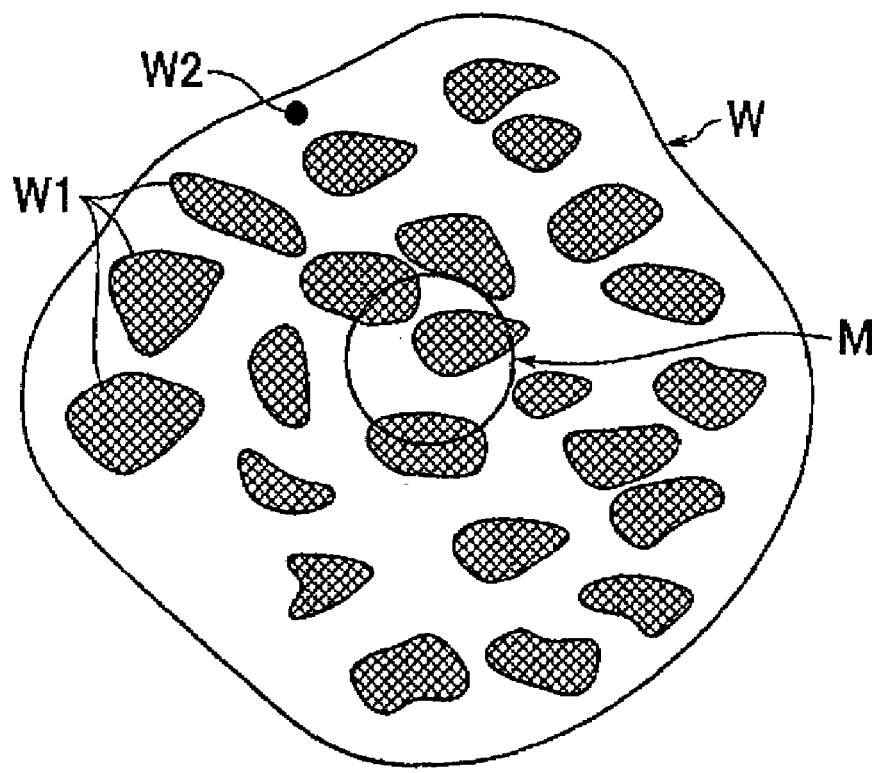
FIG. 7 is an explanatory drawing showing modeled microscopic fluctuations of the atmospheric air.
Figure 8:
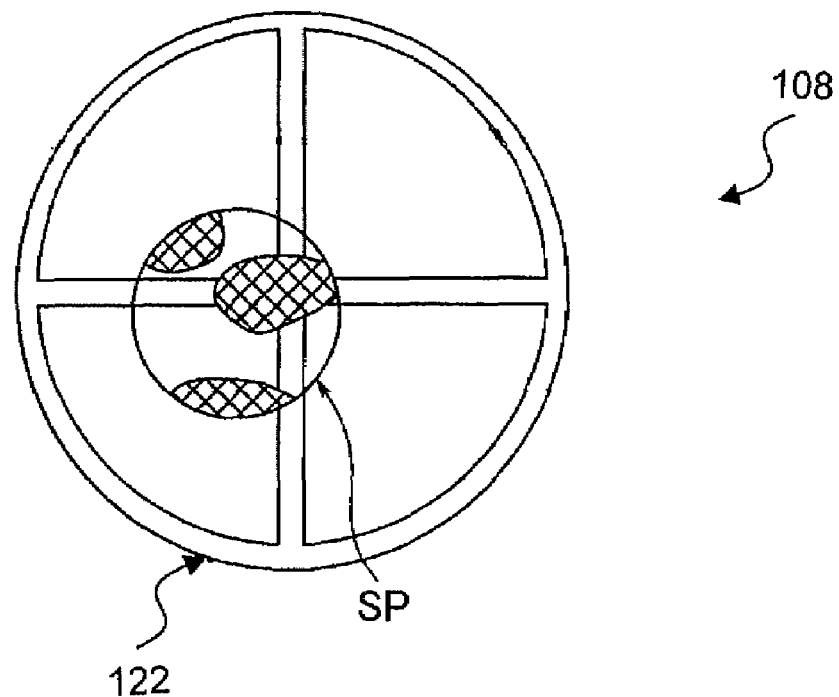
FIG. 8 is a drawing showing light reception on the position detecting photodetector of the optical transmission device of the related art.
Figure 9:
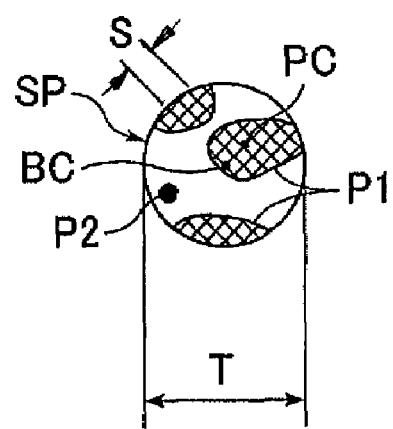
FIG. 9 is a drawing of a beam spot on the position detecting photodetector of the optical transmission device of the related art.

By arranging the respective position detecting photodetectors at the positions described above, when considering that the two photodetectors are located on the identical optical axis, the blind zones are generated only at two points where the separation zones intersect by the combining actions of the two photodetectors as shown by black areas in FIG. 4, and hence the areas of the separation zones on the photodetectors are substantially zero. In other words, detection signals of the two photodetectors can perform mutual correction, even when the spot of the received light beam LBb falls within the center of the separation zones of the first photodetector 8a, which is actually the optimal position, the received light beam LBb can be detected by the second photodetector 8b. Therefore, even when there is no signal supplied from the first photodetector 8a, the control unit can recognize that the actual optical axis exists at the center of the first photodetector 8a from a signal supplied from the second photodetector 8b.

When only one position detecting photodetector is provided, as in the example of the related art, when the spot of the received light beam LBb moves along the separation zones, it is impossible to detect the direction. In contrast, according to the configuration of the present embodiment, even when the spot of the received light beam LBb falls within the two points (intersecting points of the separation zones of the two photodetectors), which are remaining blind zones, since they are spots of small areas, the direction can be detected by slightly moving the spots unlike the case where there is only one position detecting photodetector in which the blind zone is linear. Therefore, there is little possibility that the function of the system is impaired.

The difference in intensity of the light beam detected by the respective sensors on the position detecting photodetectors 8a or 8b is transmitted to the mirror drive control unit 11 via the signal processing unit 10 as misalignment information. In the normal mode in which the received light beam emitted from the partner transmitting unit can be detected without loosing sight, misalignment information supplied from the first photodetector 8a is processed at the signal processing unit 10. In contrast, in the mode in which the received light emitted from the partner transmitting unit falls within the separation zones of the first photodetector 8a, and hence the received light beam cannot be detected, a signal from the second photodetector 8b is verified to recognize the fact that the spot is located at the center of the first photodetector 8a.

In this arrangement, the above-described intentional defocusing of the received light is no longer necessary, and the influence of microscopic fluctuation of atmospheric air can be restrained as much as possible since the beam can be narrowed down more than in the related art.

In addition, in the present embodiment, when processing misalignment information from the second photodetector 8b in the mode where the received light beam cannot be detected by the first photodetector 8a, the intersecting points of the separation zones of the sensors are shifted by a predetermined amount D from the ideal optical axis in both the vertical and horizontal directions. The shifting amount D is determined to be larger than the width of the separation zone so that the spots of both two sensors do not fall within the separation zone. However, in a time-sequence usage, such that when one of the sensors cannot sense a light beam, the other sensor is used, chattering may prevent proper switching of the sensors. It is therefore preferable to set the shifting amount D to more than 1.2 times the width of the separation zone. In addition, as shown in FIG. 4 by an arrow Ce, there exists an area at which the centers of the sensors overlap. Although the sensor is more sensitive at the center where the separation zones are concentrated, if the area (Ce) is too large, it is not efficient since the sensitive portions of the sensors cannot be used when the spots come on this area. Therefore, it is preferable that the D not exceed ten times the width of the separation zones. That is, the value D preferably satisfies the relation:

$1.2 \times L \leq D < 10 \times L$.

Actually, since the distance from the ideal optical axis is shifted by $\sqrt{2} \times D$, it is necessary to detect the direction and distance from the ideal optical axis, and provide corrections thereof.

If the correction of the distance and direction from the ideal optical axis is not performed, erroneous detection of direction may occur when the mode is switched, resulting in a system failure. The amount of correction of the distance and the direction from the ideal optical axis is determined by the shifted amount in the vertical and horizontal direction with respect to the optical axis of the second photodetector 8b.

The mirror drive control unit 11 transmits the optical axis direction adjust signal to the optical-axis adjustable unit 4 based on misalignment information. The optical-axis adjustable unit 4 changes the angle of the angle variable fully reflecting mirror 4a to adjust the optical axis.

Figure 10:
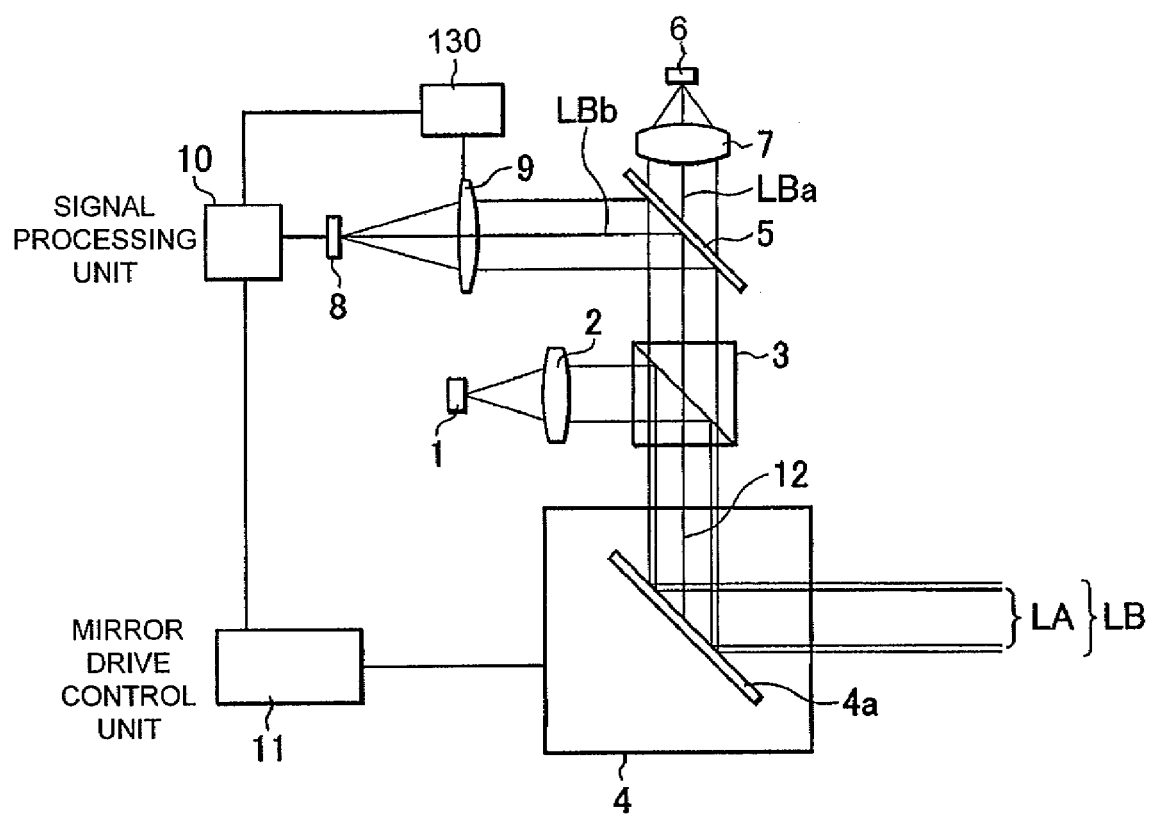
FIG. 10 illustrates an optical transmission device according to an embodiment of the present invention.

FIG. 10 is an alternate embodiment of the optical transmission device of FIG. 1 in accordance with the present invention. The present embodiment incorporates features similar to those of FIG. 1, except that the photodetectors 8a and 8b and the beam splitter 13 of FIG. 1 are not employed. Rather, as shown in FIG. 10, a single photodetector 8 and a drive unit 130 coupled to the lens group 9 are employed.

In operation, the optical transmission device of FIG. 10 is similar to that of FIG. 1 except that the remaining received light beam LBb reflected from the received light beam branching element 5 is converged directly to photodetector 8 by lens group 9, which is capable of shifting the optical axis from that point on a cross-section of the ideal optical axis taken substantially perpendicularly. To shift the optical axis, a lens shift drive control unit 13 is coupled to the lens group 9.

As shown in FIG. 2, when the shift drive control of the lens group 9 is inactive, the photodetector 8 is disposed so that the intersecting point of the separation zones (blind zones) is aligned with the optical axis of the optical system for the photodetector 8, and the actual optical axis is also focused on this intersecting point. But, as shown in FIG. 3, when the shift drive control is active, the actual optical axis is focused a position away from the intersecting point of the separation zones on the photodetector 8 by the shifting amount of D, which is larger than the width of the separation zone L, both in the vertical and horizontal directions with respect to the ideal optical axis of the optical system for the position detecting diode. The exemplary width L of the separation zone of the photodetector is 0.02 mm.

When an ON-OFF state in shift drive control of the lens group 9 is considered on the identical ideal optical axis on the photodetector, as shown by the black areas in FIG. 4, the blind zones are generated only at two points, where the separation zones intersect, by the combining action effected by the ON-OFF state of shift drive control, and hence the area of the blind zone on the photodetector is substantially zero. Specifically, since the detecting signal in the ON-OFF state of shift drive control can perform mutual correction, even when the spot of the received light beam LBb actually falls on the center of the separation zones of the photodetector 8, which is the optimal position, it can be detected by shift drive control of the lens group 9. Therefore, when no signal is transmitted from the photodetector 8, the control unit can recognize that the actual optical axis exists at the center of the photodetector 8 by performing shift drive control of the lens group 9.

When the position detecting photodetector is fixed as in the related art, it is difficult to detect the direction of movement of the spot of the LBb when it moves along the separation zone. In contrast, in the present embodiment, even when the LBb spot falls on the two points (intersecting points of the separation zones of the two devices), which are remaining blind zones, since they are not linear as in the case of only one position detecting photodetector, but are spots of small areas, the direction of movement can be detected by slightly moving the spots by effecting shift drive of the lens group 9. Therefore, it is unlikely that the function of the system will be impaired.

The difference in light intensity detected by the photodetector 8 is transmitted to the mirror drive control unit 11 as misalignment information. In the normal mode, in which the received light beam emitted from the partner transmitting unit can be detected without being lost from sight, misalignment information from the photodetector 8 is processed at the signal processing unit 10.

In contrast, when the received light beam emitted falls within the separation zone of the photodetector 8 and is not detected, the lens group 9 is shifted by a predetermined amount to receive light beam not at the separation zone, but at the detectable portion, and misalignment information is processed at the signal processing unit 10. By using such mode switching, the separation zones can be avoided by the received light beam. Therefore, defocusing of the received light, described above, is no longer necessary, and the influence of atmospheric microscopic fluctuation can be restrained since relative the related art, the beam can be further narrowed.

In the present embodiment, when the lens group 9 in such mode that the position cannot be detected by the photodetector 8, the actual optical axis is shifted by the predetermined amount D both vertically and horizontally from the intersecting point of the separation zones of the photodetector. However, since the distance of the photodetector from the intersecting points of the separation zones is actually shifted by $\sqrt{2} \times D$, it is necessary to detect the direction of the optical axis, so that both distance and direction from the ideal optical axis can be compensated.

The shifting amount D is larger than the width of the separation zone so that the spots of both two photodetectors do not fall within the separation zone. However, in a time-sequence usage, such that when one of the photodetectors cannot sense, the other photodetector is used.

The preferable setting for the shifting amount D is over 1.2 times the width of the separation zone. In addition, as shown in FIG. 4 by an arrow Ce, there exists an area at which the centers of the detectors overlap. Although the photodetector is more sensitive at the center where the separation zones are concentrated, if the area (Ce) is too large, it is not efficient since the sensitive portions of the detectors cannot be used when the spots come on this area. Therefore, it is not preferable that the value D exceeds ten times that of the width of separation zone. Specifically, the value D should preferably satisfy the relation:

$$1.2 \times L \leq D < 10 \times L.$$

The amount of correction of the distance and the direction from the ideal optical axis is determined by the shifted amount in the vertical and horizontal direction with respect to the optical axis of the lens group 9.

A mirror drive control unit 11 transmits an optical-axis direction adjust signal to the optical axis adjustable unit 4 based on misalignment information. The optical axis adjustable unit 4 changes the angle of the variable angle fully reflecting mirror 4a to adjust the optical axis.

Figure 11:
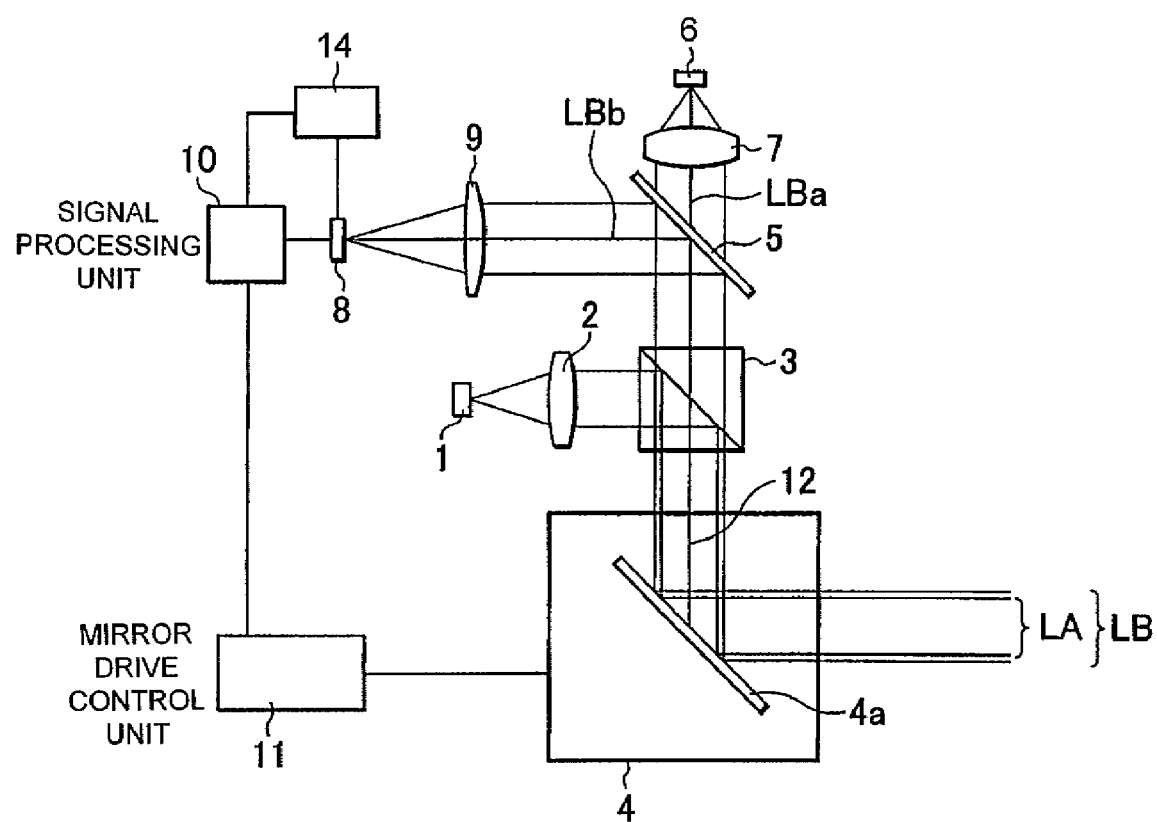
FIG. 11 illustrates an optical transmission device according to an embodiment of the present invention.

FIG. 11 is a diagram of the optical transmission device according to another embodiment of the present invention. Its operation is similar to the device of FIG. 10, except that it is photodetector 8 (not the lens group 9) that is under control of a shift drive control unit 14.

In an inactive state (FIG. 2) of the shift drive control unit 14, the photodetector 8 is disposed at a position where the intersecting point of the separation zones (blind zones) of the photodetector is aligned with the optical axis of the position detecting photodetector optical system. In contrast, when active as in FIG. 3, the position detection photodetector 8 is disposed at a position shifted by the shifting D, which is larger than the width of the separation zone of the photodetector, both in the vertical and horizontal directions with respect to the optical axis of the position detecting photodetector optical system.

When these two shifting state of the photodetector 8 are considered on the identical ideal optical axis on the photodetector, as shown by the black areas in FIG. 4, the blind zones are generated only at two points, where the separation zones intersect, by the combining action effected by the ON-OFF state of shift drive control by the photodetector 8, and hence the area of the blind zone on the photodetector is substantially zero. In other words, the detecting signal in the ON-OFF state of shift drive control can perform mutual correction, even when the spot of the received light beam LBb actually falls on the center of the separation zones of the photodetector 8, which is the optimal position, it can be detected by performing shift drive control of the of the photodetector 8. Therefore, when no signal is transmitted from the photodetector 8, the control unit can recognizes that the actual optical axis exists at the center of the position detecting photodetector by performing shift drive control of the photodetector 8.

As described thus far, the optical transmission devices disposed at a predetermined distance apart so as to face each other and configured in such a manner that the device on the transmitting side converts an electrical signal to an optical signal and transmits it to the receiving device and the device on the receiving side converts the received optical signal into an electric signal so that two-way information transmission is effected, the optical transmission device having an incidence direction detecting means for detecting the direction of incidence of a luminous flux emitted from a transmitting unit of an opposed partner device and directing a luminous flux emitted by itself towards the direction of incidence of the luminous flux, a cost effective optical transmission device in comparison with the technology such as the diffraction optical element or the like described above, and capable of performing stable communication is achieved.

Note that while the embodiment of FIG. 1 shows that the position detecting photodetectors are the first and second photodetectors 8a and 8b, three or more position detecting photodetectors can be employed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical transmission device configured to perform two-way communication with other optical transmission devices which are spatially separated from the optical transmission device, the optical transmission device comprising:

a light-emitting element for convening an electronic signal to an optical signal;

a first light-receiving photodetector for signal detection for converting a received optical signal to an electronic signal;

at least two other light-receiving photodetectors for position detection, each photodetector including a plurality of light receiving elements separated by a separating band having a width L, for detecting a receiving position of a luminous flux emitted from an other light-emitting element from one of the other optical transmission devices spatially separated from the optical transmission device, wherein each of the other light-receiving photodetectors are separate and independent from the first light-receiving photodetector; and a mirror adjustable so as to align an optical axis of the luminous fluxes emitted from the other light-emitting element from the opposed partner device with an optical axis of the luminous fluxes emitted from said light-emitting element of said optical transmission device in accordance with a detected position by the at least two other light-receiving photodetectors for position detection, wherein said at least two other light-receiving photodetectors for position detection are arranged so that receiving positions of said at least two light-receiving photodetectors are shifted a distance D which is greater than the width L of the separating band with respect to a plane perpendicular to the optical axis of the optical transmission device.

2. The optical transmission device according to claim 1, wherein said other light-receiving photodetectors includes four light receiving elements separated by the separating band.

3. The optical transmission device according to claim 1, wherein a diameter of a light receiving spot formed on said at least two other light-receiving photodetectors for position detection is smaller than the width L of the separating band.

4. The optical transmission device according to claim 1, wherein the relationship 1.2×L<D<10×L is satisfied.

5. The optical transmission device according to claim 1, further comprising:

a signal processing unit in communication with the at least two other light-receiving photodetectors for position detection; and a mirror drive control unit in communication with the signal processing unit, the mirror drive control unit configured to generate a correction signal, wherein a difference in intensity of the light beam detected by the at least two other light-receiving photodetectors for position detection is transmitted to the mirror drive control unit as misalignment information.

6. The optical transmission device according to claim 5, wherein, in a normal mode in which a received light beam from one of the other optical transmission devices spatially separated from the optical transmission device can be detected without loosing sight, misalignment information supplied from a first one of the at least two other light-receiving photodetectors for position detection is processed at the signal processing unit.

7. The optical transmission device according to claim 5, wherein, in a mode in which a received light beam from one of the other optical transmission devices spatially separated from the optical transmission device falls within the separation band of a first one of the at least two other light-receiving photodetectors for position detection such that the received light cannot be detected, a signal from a second one of the at least two other light-receiving photodetectors for position detection is verified to recognize whether a light receiving spot is located at the center of the first one of the at least two other light-receiving photodetectors.

8. The optical transmission device according to claim 7, wherein intersecting points of separation zones of the first and second ones of the at least two other light-receiving photodetectors for position detection are shifted by a predetermined amount D from the optical axis in both vertical and horizontal directions.

9. The optical transmission device according to claim 7, wherein intersecting points of separation zones of the first and second ones of the at least two other light-receiving photodetectors for position detection are shifted by a predetermined amount D from the optical axis in both vertical and horizontal directions.

10. An optical transmission device configured to perform two-way communication with other optical transmission devices which are spatially separated from the optical transmission device, the optical transmission device comprising:

a light-emitting element for converting an electronic signal to an first luminous flux;

a first light-receiving photodetector for signal detection by receiving second luminous flux from one of the other optical transmission devices spatially separated from the optical transmission device;

at least two other light-receiving photodetectors for position detection, each photodetector including a plurality of light receiving elements separated by a separating band having a width L, for detecting a receiving position of the second luminous flux, wherein the first light-receiving photodetector and the other light-receiving photodetectors are separate and independent each other; and a mirror adjustable so as to align an optical axis of the first luminous flux with an optical axis of the second luminous flux in accordance with a detected position by the at least two other light-receiving photodetectors, wherein said at least two other light-receiving photodetectors are arranged so that receiving positions of said at least two light-receiving photodetectors are shifted a distance D which is greater than the width L of the separating band with respect to a plane perpendicular to the optical axis of the first or second luminous flux.

* * * * *